(12) United States Patent
Patterson et al.

(10) Patent No.: US 9,335,931 B2
(45) Date of Patent: May 10, 2016

(54) SYSTEM AND METHOD FOR MAKING SNAPSHOTS OF STORAGE DEVICES

(75) Inventors: Andrew Patterson, San Jose, CA (US); James Hughes, Palo Alto, CA (US); Hao Zhang, Shenzhen (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 350 days.

(21) Appl. No.: 13/175,251

(22) Filed: Jul. 1, 2011

(65) Prior Publication Data

US 2013/0007389 A1   Jan. 3, 2013

(51) Int. Cl.
G06F 3/06   (2006.01)
G06F 11/14   (2006.01)

(52) U.S. Cl.
CPC ............. *G06F 3/061* (2013.01); *G06F 3/065* (2013.01); *G06F 3/067* (2013.01); *G06F 3/0673* (2013.01); *G06F 11/1469* (2013.01); *G06F 11/1451* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 5,402,428 A | | 3/1995 | Kakuta et al. |
| 5,907,672 A | * | 5/1999 | Matze et al. ............. 714/6.13 |
| 5,909,700 A | * | 6/1999 | Bitner et al. ............. 711/162 |
| 6,052,758 A | | 4/2000 | Crockett et al. |
| 6,243,824 B1 | * | 6/2001 | Kakuta et al. ............. 714/3 |
| 6,799,258 B1 | * | 9/2004 | Linde ............. 711/162 |
| 7,174,352 B2 | * | 2/2007 | Kleiman et al. |
| 7,346,799 B2 | | 3/2008 | Uhlmann et al. |
| 7,373,366 B1 | * | 5/2008 | Chatterjee et al. |
| 7,461,293 B2 | | 12/2008 | Ohno et al. |
| 7,523,278 B2 | | 4/2009 | Thompson et al. |
| 7,702,670 B1 | * | 4/2010 | Duprey et al. ............. 707/646 |
| 7,870,356 B1 | * | 1/2011 | Veeraswamy et al. ........ 711/162 |
| 8,010,495 B1 | * | 8/2011 | Kuznetzov et al. ........... 707/649 |

(Continued)

FOREIGN PATENT DOCUMENTS

| | | |
|---|---|---|
| CN | 101140536 A | 3/2008 |
| CN | 101741911 A | 6/2010 |

(Continued)

OTHER PUBLICATIONS

Cully, B., et al., "Remus: High Availability via Asynchronous Virtual Machine Replication," NSDI '08: 5th USENIX Symposium on Networked Systems Design and Implementation, pp. 161-174.

(Continued)

*Primary Examiner* — Nathan Sadler
(74) *Attorney, Agent, or Firm* — Slater Matsil, LLP

(57) ABSTRACT

A system and method for making snapshots of storage devices are provided. A method for making a snapshot of a volume includes setting the volume to a read-only mode, receiving an access attempt for the volume, and if the access attempt is a write access attempt, buffering information associated with the write access attempt in a buffer, and updating a snapshot indicator based on the information associated with the write access attempt, where the snapshot indicator includes block information regarding a block in the volume that is a target of the write access attempt. The method also includes if the access attempt is a read access attempt, providing read information requested in the read access attempt, where the read information is based on the volume, or a combination of the snapshot indicator, the buffer, and a buffer indicator.

25 Claims, 7 Drawing Sheets

(56) References Cited

U.S. PATENT DOCUMENTS

| | | | |
|---|---|---|---|
| 8,209,568 B2 | 6/2012 | Marowsky-Bree et al. | |
| 8,554,734 B1* | 10/2013 | Chatterjee et al. | 707/640 |
| 2003/0158869 A1* | 8/2003 | Micka | 707/203 |
| 2003/0212869 A1* | 11/2003 | Burkey | G06F 11/1461 711/162 |
| 2004/0044864 A1* | 3/2004 | Cavallo | 711/162 |
| 2004/0139128 A1* | 7/2004 | Becker et al. | 707/204 |
| 2005/0027737 A1 | 2/2005 | Micka et al. | |
| 2005/0081099 A1 | 4/2005 | Chang et al. | |
| 2006/0047998 A1* | 3/2006 | Darcy | 714/6 |
| 2006/0218364 A1* | 9/2006 | Kitamura | 711/162 |
| 2007/0276885 A1 | 11/2007 | Valiyaparambil et al. | |
| 2009/0037676 A1 | 2/2009 | Coronado et al. | |
| 2009/0300305 A1 | 12/2009 | Liu | |
| 2010/0011177 A1* | 1/2010 | Ainscow et al. | 711/162 |
| 2010/0023716 A1* | 1/2010 | Nemoto et al. | 711/162 |
| 2010/0077165 A1* | 3/2010 | Lu et al. | 711/162 |
| 2010/0228919 A1* | 9/2010 | Stabrawa | G06F 11/1456 711/120 |
| 2011/0161298 A1* | 6/2011 | Grobman et al. | 707/649 |
| 2012/0331247 A1* | 12/2012 | Hoobler et al. | 711/162 |

FOREIGN PATENT DOCUMENTS

| | | |
|---|---|---|
| CN | 101819543 A | 9/2010 |
| CN | 101888405 A | 11/2010 |

OTHER PUBLICATIONS

"Extended European Search Report," Application No. 11867102.3, Applicant: Huawei Technologies Co., Ltd., Mar. 21, 2013, 10 pages.

"International Search Report and Written Opinion," International Application No. PCT/CN2011/083355, Applicant: Huawei Technologies Co., Ltd., et al., Mar. 22, 2012, 16 pages.

"International Search Report and Written Opinion," International Application No. PCT/CN2011/083351, Applicant: Huawei Technologies Co., Ltd., et al., Apr. 12, 2012, 13 pages.

Extended European Search Report, Application No. 11866436.6, date of mailing Aug. 13, 2013, Applicant Huawei Technologies Co., Ltd., 11 pages.

Office Action issued in corresponding U.S. Appl. No. 13/215,345 dated Feb. 25, 2014, 30 pages.

* cited by examiner

SYSTEM AND METHOD FOR MAKING SNAPSHOTS OF STORAGE DEVICES

TECHNICAL FIELD

The present invention relates generally to information storage, and more particularly to a system and method for making snapshots of storage devices.

BACKGROUND

Generally, users of computing systems have a need to store data, applications, and so forth. Typically, the data, applications, and so on, may be stored on a storage device, which may be located local to the user, remotely located from the user, or a combination thereof.

An important feature of a storage system may be an ability to take a snapshot of a storage device's state (or a portion of the storage device's state) at a specified point in time and create a new storage volume from the snapshot. The snapshot may allow users to revert to an earlier state without requiring a lot of work.

As an example, consider a user operating a virtual machine in a cloud computing environment. The user may have a need to create and maintain disk volumes, effectively virtual block devices. To the virtual machine, the disk volume may appear as a local device, such as a disk drive, but may be stored on at a number of locations within the cloud computing infrastructure. The user may have a need to create and delete volumes, attach and detach them to virtual machines, create snapshots, and create new volumes from such a snapshot.

A prior art technique of creating a snapshot of a disk volume involves making a protected copy of the disk volume, for example, to another disk drive or to a remote storage device, and allowing the user access (e.g., read and/or write) to the disk volume. However, if the disk volume is large, making a copy of the disk volume may take a long time and may require the transfer of a large amount of information and a lot of processing.

Therefore, there is a need to be able to create snapshots of disk volumes with minimum processing and data transfer.

SUMMARY OF THE INVENTION

These and other problems are generally solved or circumvented, and technical advantages are generally achieved, by example embodiments of the present invention which provides a system and method for making snapshots of storage devices.

In accordance with an example embodiment of the present invention, a method for making a snapshot of a volume is provided. The method includes setting the volume to a read-only mode, receiving an access attempt for the volume, and if the access attempt is a write access attempt, buffering information associated with the write access attempt in a buffer, and updating a snapshot indicator based on the information associated with the write access attempt, where the snapshot indicator includes block information regarding a block in the volume that is a target of the write access attempt. The method also includes if the access attempt is a read access attempt, providing read information requested in the read access attempt, where the read information is based on the volume, or a combination of the snapshot indicator, the buffer, and a buffer indicator.

In accordance with another example embodiment of the present invention, a method for operations is provided. The method includes receiving a request to roll back a state of a volume, determining a snapshot corresponding to the state, determining if at least one intermediate snapshot exists between the snapshot and an initial snapshot of the volume, applying a change to the volume based on the snapshot, and applying an intermediate change to the volume based on the at least one intermediate snapshot if the at least one intermediate snapshot exists and if the intermediate change is not to a block of the volume affected by the snapshot.

In accordance with another example embodiment of the present invention, a device is provided. The device includes a volume control unit, a network interface, a request process unit coupled to the network interface, a snapshot bitmap control unit coupled to the request process unit, a write buffer control unit coupled to the request process unit and to the volume control unit, and a data processing unit coupled to the request process unit. The volume control unit sets read and/or write permissions for a volume, the network interface receives a request to make a snapshot of the volume, and receives an access attempt for the volume, and the request process unit determines a nature of an access request. The snapshot bitmap control unit updates a snapshot indicator based on a write access attempt, where the snapshot indicator includes block information regarding a block in the volume that is a target of the write access attempt. The write buffer control unit buffers information associated with the write access attempt to the volume and updates a buffer indicator based on the information associated with the write access attempt. The data processing unit generates read information requested in a read access from the volume, or a combination of a snapshot indicator, a buffer, and a buffer indicator.

In accordance with another example embodiment of the present invention, a device is provided. The device includes a volume control unit, a receiver, a write buffer control unit coupled to the receiver and to the volume, a snapshot bitmap control unit coupled to the receiver, and a data processing unit coupled to the receiver and to the volume. The volume control unit sets a volume to a read-only mode, the receiver receives an access attempt for the volume, the access attempt being a write access attempt or a read access attempt. The write buffer control unit buffers information associated with a write access attempt to the volume in a buffer when the access attempt is a write access attempt. The snapshot bitmap control unit updates a snapshot indicator based on the write access attempt when the access attempt is a write access attempt, where the snapshot indicator includes information regarding a block in the volume that is a target of the write access attempt. The data processing unit provides read information requested in the read access attempt when the access attempt is a read access attempt, based on the volume, or a combination of the snapshot indicator, the buffer, and a buffer indicator.

One advantage disclosed herein is that the amount of information that needs to be copied to make a snapshot may be significantly less than in prior art snapshot techniques, therefore, a snapshot may be made in less time and with less processing.

A further advantage of exemplary embodiments is that since the snapshots may occur more rapidly with fewer resources, the snapshots may be taken more frequently. The multiple snapshots may be made to allow restoration to a wide range of states.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a cloud computing environment with users having information to store in a storage device. The invention may also be applied, however, to other computing environments, such as client-server, standalone, thin client, and so forth, computing environments, wherein users have information to store in a storage device.

Figure 1:
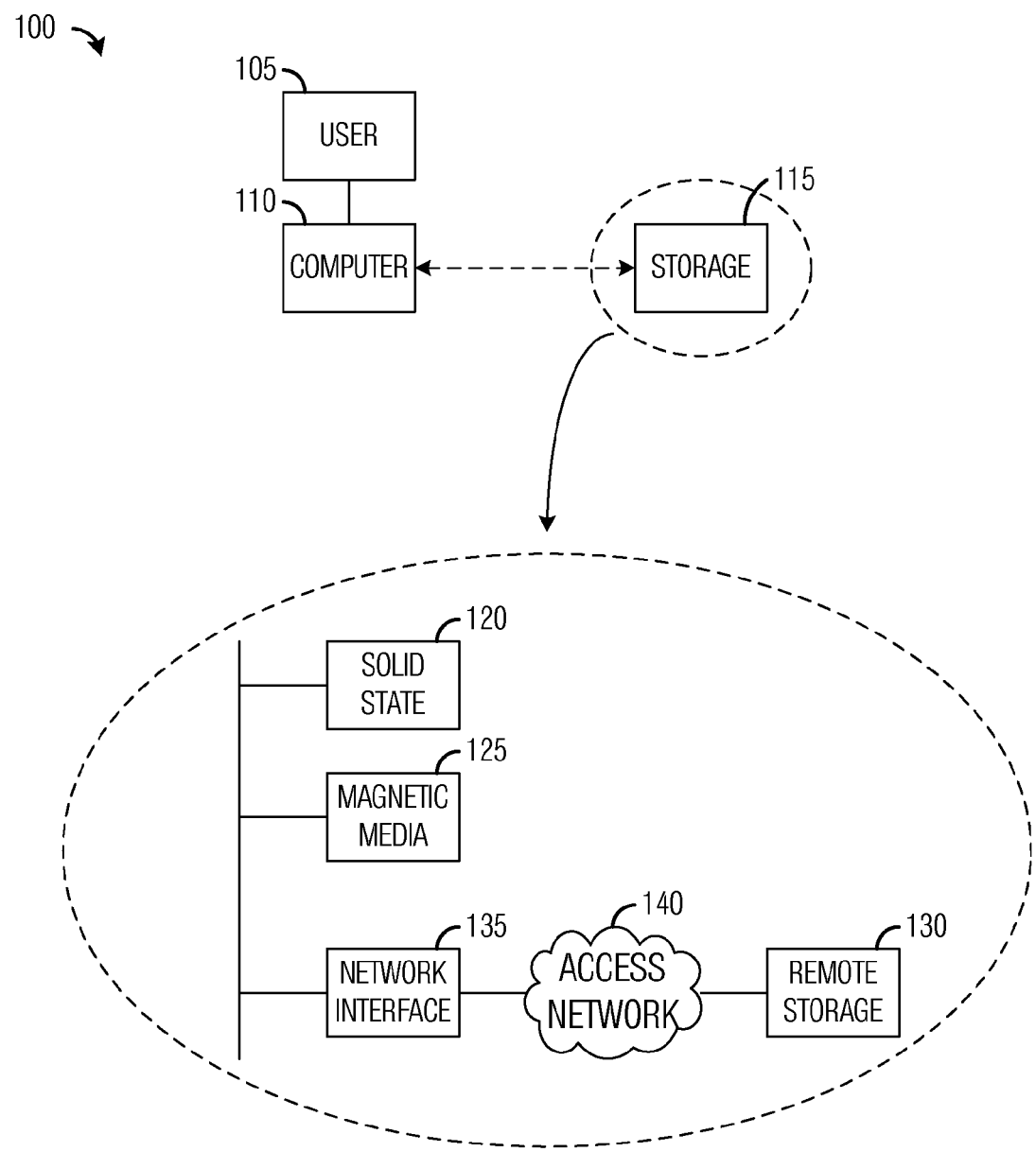
FIG. 1 illustrates an example computing environment according to example embodiments described herein.

FIG. 1 illustrates a computing environment 100. Computing environment 100 includes a user 105 that may be using a computer 110 coupled to a storage device 115. User 105 may use storage device 115 to store information, such as data, media, as well as applications, and so on. Computer 110 may make use of applications stored in storage device 115 to process data, display media, and so forth.

While it is understood that computing environments may employ multiple computers used by multiple users and are capable of storing information on multiple storage devices, only user, one computer, and one storage device are illustrated for simplicity.

Storage device 115 may be realized as a solid state memory 120 (such as flash memory, solid state hard drive, etc.) and/or a magnetic media 125 (such as magnetic disk drive, magnetic tape, or so on) that is directly coupled to computer 110, or remote storage 130 coupled to computer 110 through a network interface 135 and an access network 140. Storage device 115 may also be realized as combinations of the above.

As discussed previously, a snapshot may be taken to preserve a state of a storage device, a volume of the storage device, a portion of the storage device, a file on the storage device, a group of files on the storage device, or so on. The snapshot may be used to create a copy or a back up of information on the storage device, to prevent unintended corruption and/or deletion, enable a rollback, or so forth. As an example, a snapshot may be taken at a specified time, such as at the end of a work day or the beginning of the work day. Then, as the information is changed, deleted, augmented, etc., there is a possibility of reverting back to a saved state (i.e., one of the snapshots) if there is a need to do so.

However, if taking a snapshot requires too much time and/or overhead, a user may be unwilling to take a snapshot or to take as many snapshots as needed. As an example, consider a situation wherein taking a snapshot may require several minutes to complete, during which, the user's system may experience a noticeable performance decrease. The user may be unwilling to incur such a performance decrease as often as needed. However, if taking a snapshot requires only several seconds to complete and/or smaller performance decrease, the user may find the impact on performance more acceptable. Furthermore, the quicker and easier snapshots may induce the user to make more frequent snapshots.

Figure 2A:
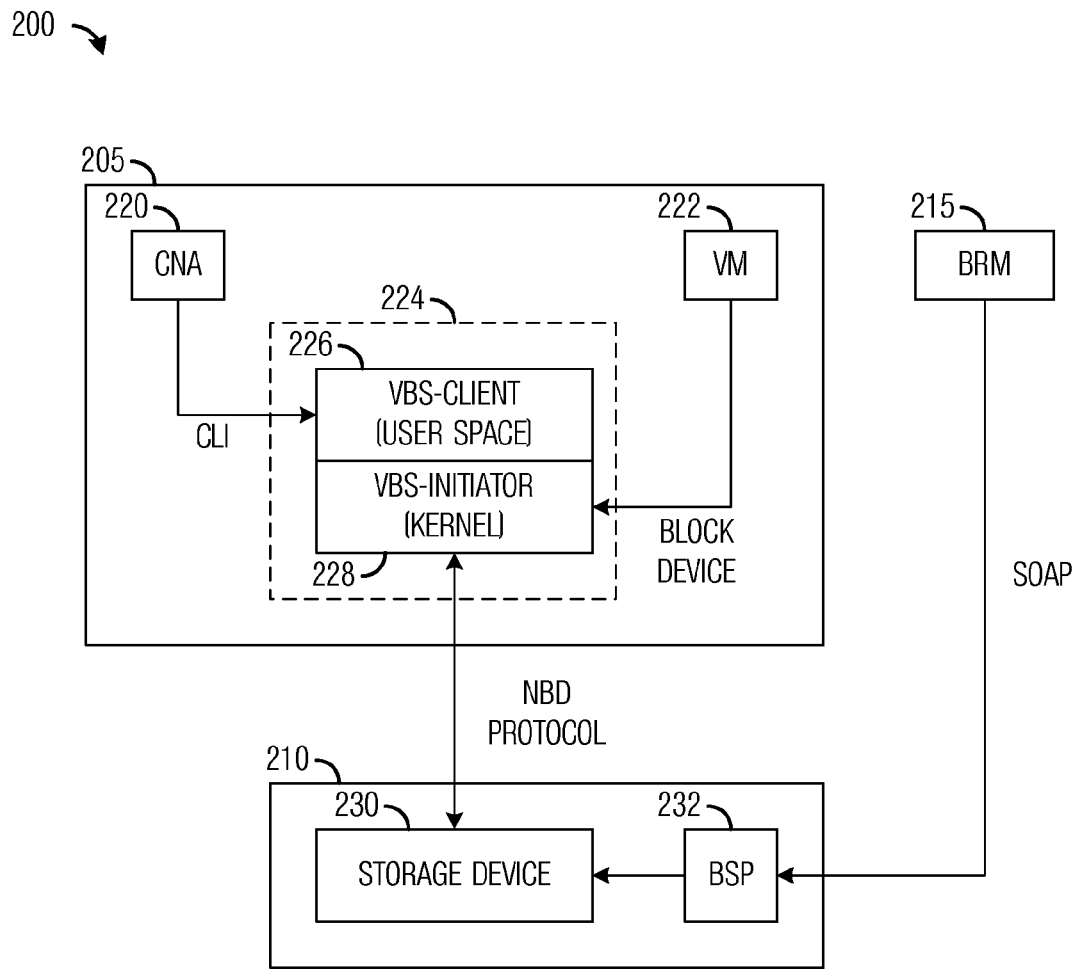
FIG. 2a illustrates an example computing system in detail according to example embodiments described herein.

FIG. 2a illustrates a computing system 200 in detail. Computing system 200 includes a computer 205. Coupled to computer 205 may be a block storage provider (BSP) node 210. BSP node 210 may be used to store information used by computer 205, and may implement advanced features, such as, snapshots. BSP node 210 may be managed by a block resource manager (BRM) 215, which may manage a placement of volumes on BSP nodes, such as BSP node 210.

Computer 205 includes a computing node agent (CNA) 220 that may be responsible for executing virtual machine (VM) instances, such as VM 222. Computer 205 also includes a virtual block store (VBS) interface 224 that may allow computer 205 and VM instances therein to access a BSP node, such as BSP node 210, and to take advantage of advanced features of the BSP node.

VBS interface 224 includes a VBS-client 226 executing in user space and a VBS-initiator 228 executing in kernel space. VBS-client 226 may be a user space administration tool for VBS-initiator 228. For example, VBS-client 226 may communicate with VBS-initiator 228 via Unix input/output control (ioctl) and Linux virtual file system (sysfs) commands. While VBS-initiator 228 may be a VBS block device driver that provides a standard block device interface to the volume. VBS-initiator 228 may also communicate with BSP node 210 using a communications protocol, such as a Linux network block device (NBD) protocol.

BSP node 210 includes a storage device 230 that provides storage for information from computer 205, and allows computer 205 access to the information. Storage device 230 may also include support for advanced functionality, such as snapshots. BSP node 210 also includes a BSP 232 that may handle requests from BRM 215, causing the creation of volumes, detecting block access requests, and so on.

Figure 2B:
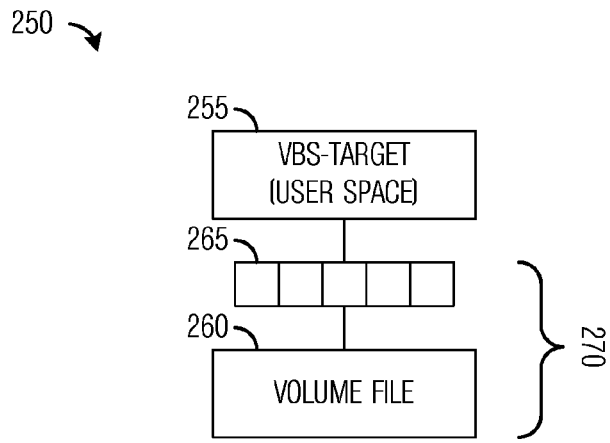
FIG. 2b illustrates a storage device in detail according to example embodiments described herein.

FIG. 2b illustrates a storage device 250 in detail. Storage device 250 may be an implementation of storage device 230 shown in FIG. 2a. Storage device 250 includes a VBS-target 255 that may operate as a VBS block device server. VBS-target 255 may create and/or delete volume files, share the volume files using a communications protocol (NBD protocol, for example), and so on. VBS-target 255 may communicate with a VBS-initiator, such as VBS-initiator 228 shown in FIG. 2a.

Storage device 250 also includes a volume file 260 and a snapshot bitmap 265 managed by VBS-target 255. Volume file 260 and snapshot bitmap 265 may be implemented on a media 270, such as dynamic memory (e.g., random access memory, and so on), solid state memory, magnetic media, and so forth. Media 270 may be representative of a file system local to storage device 250. Snapshot bitmap 265 may be used to maintain a record of which blocks in volume file 260 have been changed. Snapshot bitmap 265 may record blocks in volume file 260 that have changed (i.e., written to) since creation of volume file 260. According to an example embodiment, a single bit in snapshot bitmap 265 may correspond to a block in volume file 260. Then, if the bit is set to a specified value, then the corresponding block in volume file 260 was been modified since creation of volume file 260 or since creation of a most recent snapshot.

The use of snapshot bitmap 265 allows VBS-target 255 to create incremental snapshots, a record of changes to a given volume file since a last snapshot or since creation of the volume if snapshot bitmap 265 corresponds to a first snapshot. Incremental snapshots utilize storage space efficiently since only changes to the volume file are stored, at a small increase in complexity involved in recreating the volume file from one or more incremental snapshots.

According to an example embodiment, creating a snapshot may involve using a snapshot bitmap to generate a set of changed blocks and storing the set of changed blocks on solid state memory, magnetic media, storage service (such as Object Store (OBS)), or combinations thereof. A snapshot timestamp may also be stored to facilitate recovery.

According to an example embodiment, a size of snapshot bitmap 265 may be dependent upon a number of factors, such as an expected size of a volume file, a size of blocks of the volume file, an expected amount of time snapshot bitmap 265 is expected to keep track of volume file accesses, an expected frequency of volume file accesses, and so on. If an overly large snapshot bitmap 265 is used, then resources may be wasted, while if an overly small snapshot bitmap 265 is used, then volume file accesses may be lost due to the unavailability of resources.

According to an example embodiment, multiple snapshot bitmaps 265 may be used to generate multiple snapshots of a single volume file. As an example, a first snapshot bitmap may be used for a first snapshot and records volume file accesses since initiation of the first snapshot, a second snapshot bitmap may be used for a second snapshot and records volume file accesses since completion of the first snapshot, a third snapshot bitmap may be used for a third snapshot and records volume file accesses since completion of the second snapshot, and so on. Storing multiple snapshot bitmaps may result in a significant storage reduction when compared to storing multiple volume files since a single volume file and multiple snapshot bitmaps are stored rather than multiple volume files (which tend to be larger than the snapshot bitmaps). Each snapshot bitmap may be marked with a time stamp to allow for recovery.

According to an example embodiment, VBS-target 255 may store each volume as a sparse file in media 270. Generally, using a sparse file to store a volume implies that the volume will only occupy as much space as is actually needed. For example, a 100 gigabyte volume that is storing only 50 gigabytes of information will occupy only 50 gigabytes of media storage space. Contrasted with situation wherein a regular non-sparse file is used to store a volume, wherein a 100 gigabyte volume will occupy 100 gigabytes of media storage space independent of how much information is actually stored in the volume.

Figure 3:
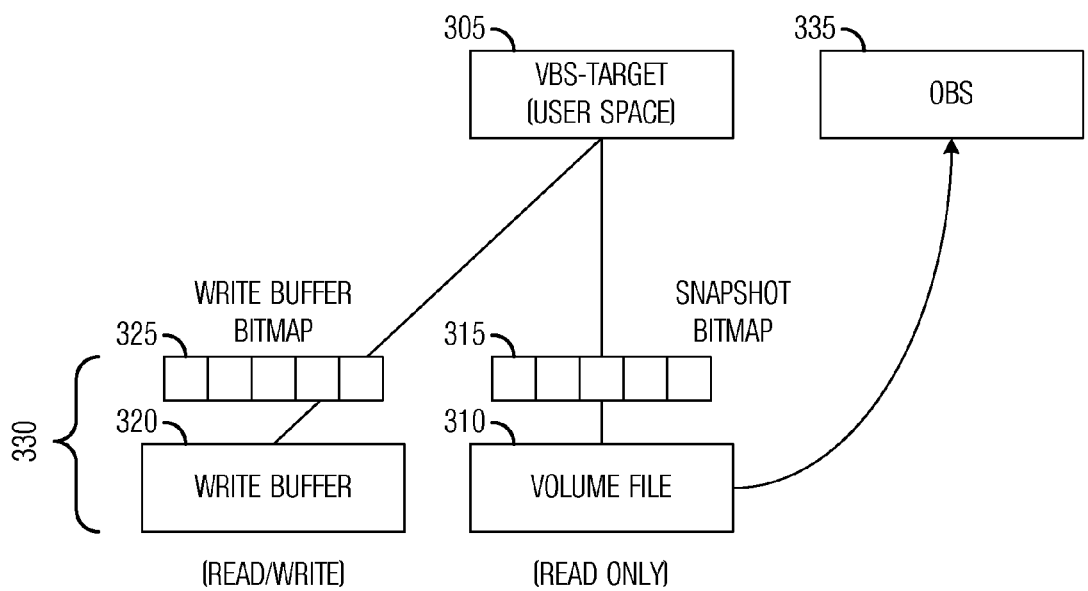
FIG. 3 illustrates an example storage device that allows read and/or write access during the taking of a snapshot according to example embodiments described herein.

FIG. 3 illustrates a storage device 300 that allows read and/or write access during the taking of a snapshot. Storage device 300 may be an implementation of storage device 230 shown in FIG. 2a. Typically, the taking of a snapshot may be a lengthy process where a large amount of information may need to be moved and/or stored. Additional measures may need to be taken to ensure full access to a volume file while a snapshot of the volume file is being made.

Storage device 300 includes a VBS-target 305, a volume file 310, and a snapshot bitmap 315 as previously described to enable the taking of snapshots. An OBS 335 may be used to store changed blocks of volume file 310, as described previously. However, to ensure that changes (i.e., writes) to volume file 310 are recorded, writes to volume file 310 may need to be stored for as long as it takes to make the snapshot, which may be made a read only volume file while the snapshot is being made to help preserve data integrity. However, write access to volume file 310 is prohibited.

According to an example embodiment, instead of allowing write access to volume file 310, a write buffer 320 and a write buffer bitmap 325 may be used to store writes to volume 310. Information associated with write access attempts to volume file 310 may be stored in write buffer 320, while write buffer bitmap 325 may be used to indicate which blocks of volume file 310 have been accessed (i.e., written to). Write buffer 320 and write buffer bitmap 325 may be implemented on a media 330. Volume file 310 and snapshot bitmap 315 may also be implemented on media 330 or a different media.

When a read access attempt is made to volume file 310, VBS-target 305 may consult write buffer bitmap 325 to determine where to retrieve requested information: from write buffer 320 if write buffer bitmap 325 indicates that a block corresponding to the read access attempt has been changed or from volume file 310 if write buffer bitmap 325 indicates that a block corresponding to the read access attempt has not been changed.

According to an example embodiment, once the snapshot is complete, contents of write buffer 320 may be written to volume file 310 and write buffer 320 discarded (flushed), i.e., volume file 310 is being updated with information in write buffer 320. Volume file 310 may remain available for read and/or write access while contents of write buffer 320 are written to volume file 310 and write buffer 320 is discarded. Write access received during the update of volume file 310 may be directly written to volume file 310 and if a corresponding bit in write buffer bitmap 325 is set to indicate that a write access attempt has been recorded for the block, then the corresponding bit may be reset. Furthermore, a write access attempt in write buffer 320 associated with the corresponding bit is discarded rather than written to volume file.

According to an example embodiment, a size of write buffer bitmap 325 may be dependent upon a number of factors, such as an expected size of a volume file, a size of blocks of the volume file, an expected amount of time write buffer bitmap 325 is expected to keep track of volume file accesses, an expected frequency of volume file accesses, and so on. If an overly large write buffer bitmap 325 is used, then resources may be wasted, while if an overly small write buffer bitmap 325 is used, then volume file accesses may be lost due to the unavailability of resources.

Figure 4:
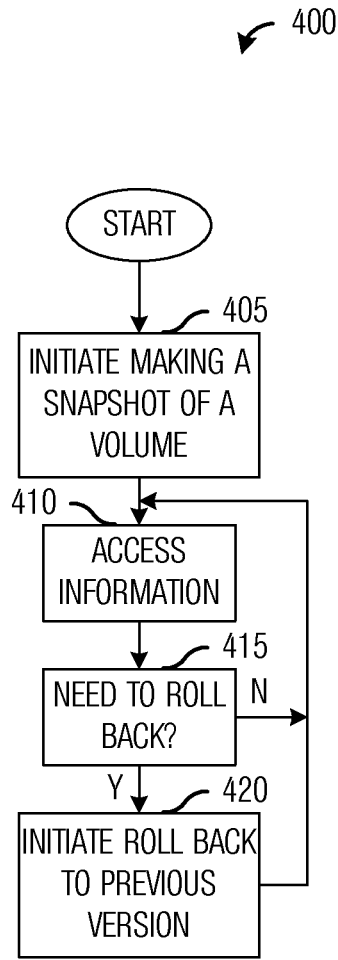
FIG. 4 illustrates an example flow diagram of user operations in utilizing snapshots of volumes according to example embodiments described herein.

FIG. 4 illustrates a flow diagram of user operations 400 in utilizing snapshots of volumes. User operations 400 may be indicative of operations occurring in a user or a computer (e.g., a virtual machine) being operated by a user as the user makes use of snapshots of volumes to preserve volume state as well as to restore a previous volume state. User operations 400 may occur while the user or the computer being operated by the user is in a normal operating mode.

User operations 400 may begin with the user initiating a making of a snapshot of a volume (block 405). As illustrative examples, the user may initiate the making of the snapshot at the start of a work day, at the end of the work day, at scheduled intervals during the work day, when the user arrives at an important point that is deemed to be valuable (such as a completion of a working draft, etc.), when the user receives an instruction to initiate the making of the snapshot, and so forth.

The user may initiate the making of the snapshot of the volume by sending an instruction or a command to a controller of the volume, executing a snapshot application or program, send a request to an administrator, or so on. Alternatively, the making of the snapshot may be configured to occur at specified times, such as at the start of a day or at the end of the day, or upon an occurrence of an event, such as when the user logs into the computer for the first time each day, when the user logs out of the computer at the end of the day, or so on.

As discussed previously, the snapshot of the volume may involve the controller of the volume setting the volume to be a read-only volume, buffering writes to the volume, maintaining indications of blocks in the volume that are targets of the buffered writes, maintaining indications of blocks in the volume that have been changed since initiation of the making of the snapshot, and so on. Furthermore, multiple snapshots may be made using multiple buffers and indications.

After initiating the making of the snapshot of the volume, the user may continue to access the volume, as if the making of the snapshot of the volume was not taking place (block 410). For example, the user may perform read access attempts to the volume and read information stored in the volume. Furthermore, the user may also perform write access attempts to the volume and store information on the volume. The controller of the volume may maintain coherency of the volume by tracking and buffering information associated with write access attempts while the making of the snapshot is occurring.

While operating, the user may determine that there is a need to roll back (i.e., restore) the state of the volume to an earlier time. For example, the user may determine that there is a need to roll back if the user determines that an error has been made and there the easiest way to recover from the error is to restore to an earlier state, information has been mistakenly deleted or otherwise lost and restoring to the earlier state is the only way to recover the lost information, or so on.

The user may perform a check to determine if there is a need to roll back the state of the volume (block 415). If there is not a need to roll back the state of the volume, then the user may continue to access information in the volume (block 410). However, if there is a need to roll back the state of the volume, then the user may initiate a roll back of the volume to the earlier state (block 420). According to an example embodiment, the user may initiate the roll back of the volume by sending a command to the controller of the volume, execute a roll back application and/or program, send a request to an administrator, or so forth. The user may include information related to which state of the volume the user wishes to roll back to. As an example, the user may provide a time corresponding to the state of the volume, the user may provide a state revision number, or so on.

Figure 5:
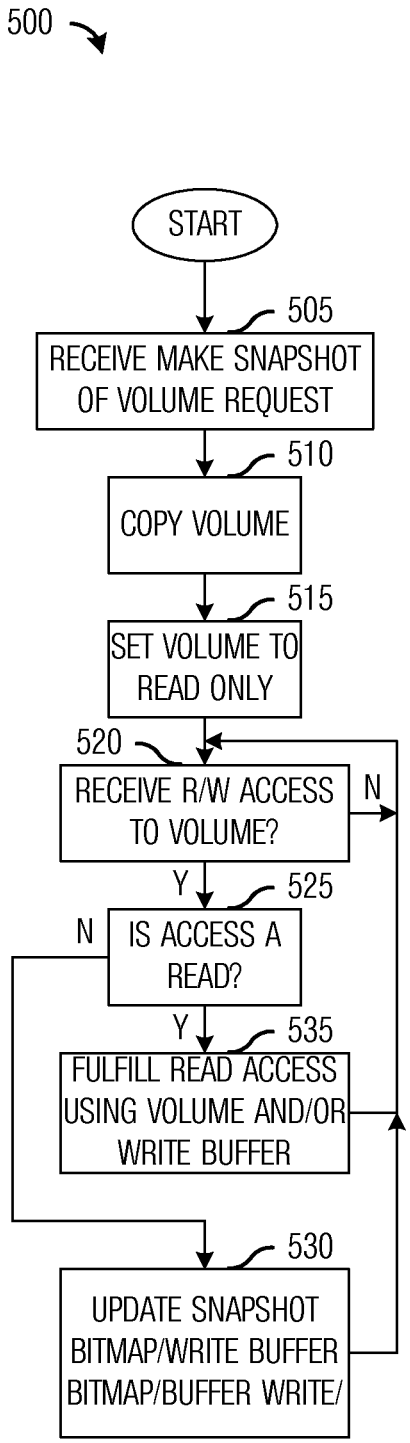
FIG. 5 illustrates an example flow diagram of controller operations in making a volume snapshot according to example embodiments described herein.

FIG. 5 illustrates a flow diagram of controller operations 500 in making a volume snapshot. Controller operations 500 may be indicative of operations occurring in a controller, such as a VBS-target, of a storage device as the controller controls access to the storage device. Controller operations 500 may occur while the controller is in a normal operating mode.

Controller operations 500 may begin with the controller receiving a request to make a snapshot of a volume (block 505). According to an example embodiment, the request to make the snapshot of the volume may be in the form of an instruction or a command, a snapshot application or program, a request from an administrator, or so on.

Upon receipt of the request to make the snapshot, the controller may initiate a copy of the volume (block 510). According to an example embodiment, the copy of the volume may be made on a different form of local media, a different storage device (e.g., a different hard disk, a different solid state drive, or so on), a remotely located storage device, a cloud storage device, or so forth.

According to an example embodiment, if the snapshot is an incremental snapshot, then it may not be necessary to copy the volume since the copy of the volume either already exists or is currently being copied. Incremental snapshots may be based on a snapshot of the volume associated with a previous full snapshot and intermediate incremental snapshots.

Since the copy of the volume may take an extended amount of time due to a potentially large amount of information to be copied, the controller may need to take additional measures to allow continued access to information in the volume. According to an example embodiment, the controller may allow continued access to information in the volume by granting read access attempts to the volume as it is being copied and buffering information associated with write access attempts to the volume while the volume is being copied.

The controller may continue to allow access to the information in the volume by setting the volume to a read-only volume (block 515), thereby preventing changes to the volume. The controller may buffer information associated with write access attempts to the volume, storing the changes to the volume while the snapshot is being made.

According to an example embodiment, the controller may regulate access to the volume as follows. The controller may perform a check to determine if there is an access attempt to information stored in the volume (block 520). If there are no access attempts to the information stored in the volume, the controller may continue to wait for future access attempts to the information stored in the volume.

If there is an access attempt to the information stored in the volume, then the controller may perform a check to determine if the access attempt is a read access attempt or a write access attempt (block 525).

If the access attempt is a write access attempt, then the controller may store information associated with the write access attempt in a write buffer as well as update an indicator, e.g., a snapshot bitmap (block 530). The write buffer may be used to store the information being written to the volume, while the snapshot bitmap (the indicator) may be used to store information about which block of the volume has been changed, i.e., which block of the volume corresponds to the information associated with the write access attempt buffered in the write buffer. In addition to storing the information being written to the volume, additional information regarding the write access attempt, such as amount of information, time of write access attempt, which block(s) are affected by the write access attempt, location on the block(s), and so on, may also be stored.

According to an example embodiment, a second indicator, e.g., a write buffer bitmap, may be used to store information about which block of the volume corresponds to the write access attempt buffered in the write buffer. After the write access attempt and the information associated with the write access attempt have been buffered and recorded (in the snapshot bitmap and/or the write buffer bitmap), the controller may return to block 520 to wait for future access attempts.

If the access attempt is a read access attempt, then the controller may fulfill the read access attempt using the indicator, the volume, the write buffer, the write buffer bitmap, or combinations thereof (block 535). For example, if the indicator indicates that the read access attempt is for a block that has not been modified since the initiation of the snapshot of the volume, then the controller may fulfill the read access attempt by simply retrieving the requested information from the volume. While if the indicator indicates that the read access attempt is for a block that has been modified since the initiation of the snapshot of the volume, then the controller may fulfill the read access attempt by checking the write buffer bitmap to determine which write access attempt modified the block and then retrieve the information associated with the write access attempt that modified the block from the write buffer to fulfill the read access attempt. The controller may further need to access the volume if the read access attempt requested more information from the block than what is stored in the write buffer, e.g., the read access attempt requested some information that has been modified and some information that has not been modified. After the read access attempt has been fulfilled, the controller may return to block 520 to wait for future access attempts.

If there are incremental snapshots, read access attempt may require that snapshot bitmaps of intermediate incremental snapshots be checked to determine if a block being access has been modified.

According to an example embodiment, since incremental snapshots may be based on a snapshot made earlier, it may not be necessary to make a copy of the volume. Instead, the incremental snapshot comprises information related to access attempts (mainly write access attempts) on the volume that have occurred since the last time a snapshot (either an incremental snapshot or a non-incremental snapshot) was made until another snapshot is made. The information related to the access attempts may be stored in a write bitmap, a write buffer, and a write buffer bitmap associated with the incremental snapshot.

As discussed previously, a snapshot may be either an incremental snapshot or a non-incremental snapshot. A non-incremental snapshot may be a snapshot that is based solely on the volume of which it is made, while an incremental snapshot may be a snapshot that is based not only on the volume of which it is made but also on other snapshots of the volume made prior to when the incremental snapshot is made. The controller's actions upon completion of the making of a snapshot may differ depending upon the nature of the snapshot, i.e., an incremental snapshot or a non-incremental snapshot.

Figures 6, 7:
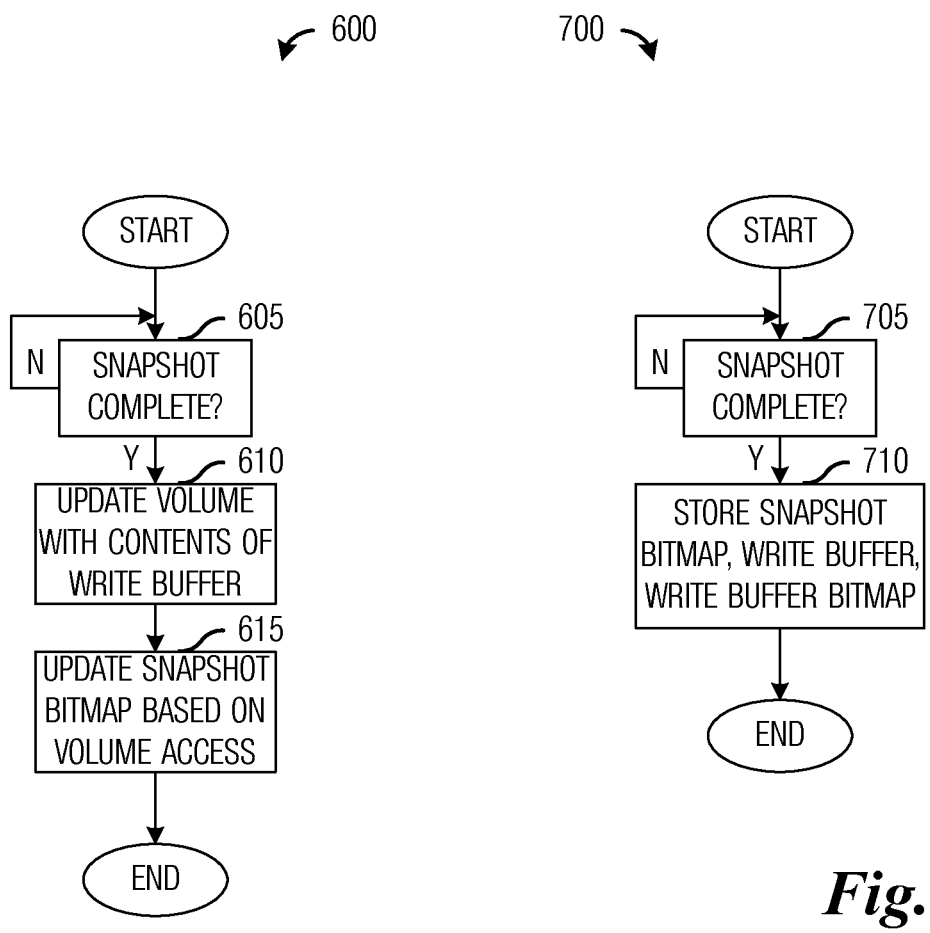
FIG. 6 illustrates an example flow diagram of controller operations in operations after completion of a non-incremental snapshot according to example embodiments described herein.
FIG. 7 illustrates an example flow diagram of controller operations in operations after completion of an incremental snapshot according to example embodiments described herein.

FIG. 6 illustrates a flow diagram of controller operations 600 in operations after completion of a non-incremental snapshot. Controller operations 600 may be indicative of operations occurring in a controller, such as a VBS-target, of a storage device as the controller controls access to the storage device. Controller operations 600 may occur while the controller is in a normal operating mode.

Controller operations 600 may begin with the controller performing a check to determine if a snapshot is complete (block 605). According to an embodiment, the snapshot may be determined to be complete once a copy of the volume is complete, wherein the copy of the volume will be the snapshot once the copy is complete. If the snapshot is not complete, the controller may continue to check on the completion of the snapshot.

If the snapshot is complete, then the controller may update the volume with the information associated with the write access attempts to the volume stored in the write buffer (block 610). As discussed previously, the write buffer may be used to store the information associated with the write access attempts to the volume that occur while the snapshot is being made. The information associated with the write access attempts may be written to the volume and if blocks associated with the write access attempts are marked as having been changed, the indicators corresponding to the blocks may be cleared since the volume is now up to date and any older copies should not be copied (block 615).

FIG. 7 illustrates a flow diagram of controller operations 700 in operations after completion of an incremental snapshot. Controller operations 700 may be indicative of operations occurring in a controller, such as a VBS-target, of a storage device as the controller controls access to the storage device. Controller operations 700 may occur while the controller is in a normal operating mode.

Controller operations 700 may begin with the controller performing a check to determine if a snapshot is complete (block 705). According to an embodiment, the snapshot may be determined to be complete once a copy of the volume is complete, wherein the copy of the volume will be the snapshot once the copy is complete. If the snapshot is not complete, the controller may continue to check on the completion of the snapshot.

If the snapshot is complete, then the controller may store the snapshot bitmap, the write buffer, and the write buffer bitmap so that they may be retrieved for subsequent use if it is necessary to roll back the state of the volume (block 710). Future access attempts to the volume may be stored in new snapshot bitmaps, write buffers, and write buffer bitmaps if the access attempts are write access attempts, and if the access attempts are read access attempts, then the snapshot bitmap, the write buffer, and the write buffer bitmap for the incremental snapshot (as well as any other intermediate incremental snapshots that are involved) and the volume may be used to fulfill the read access attempts.

Figure 8:
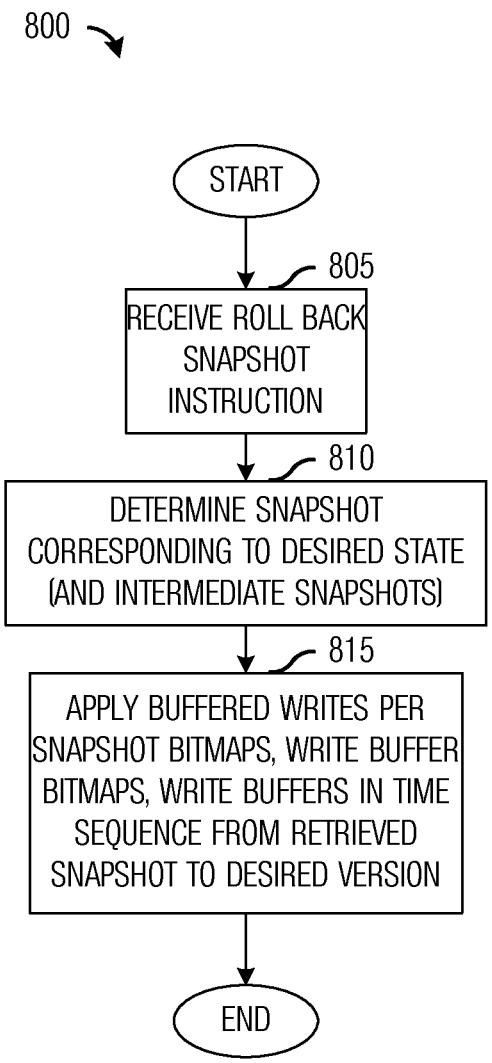
FIG. 8 illustrates an example flow diagram of controller operations in restoring a state of a volume using a snapshot according to example embodiments described herein.

FIG. 8 illustrates a flow diagram of controller operations 800 in restoring a state of a volume using a snapshot. Controller operations 800 may be indicative of operations occurring in a controller, such as a VBS-target, of a storage device as the controller controls access to the storage device. Controller operations 800 may occur while the controller is in a normal operating mode.

Controller operations 800 may begin with the controller receiving a request to roll back a volume to a specified state (block 805). According to an example embodiment, the request to roll back the volume may be in the form of an instruction or a command, a snapshot application or program, a request from an administrator, or so on.

Upon receipt of the request to roll back the volume to the specified state, the controller may determine a snapshot of the volume that corresponds to the desired state (block 810). For example, the request may provide a time and the controller may determine which snapshot corresponds to the time or is the snapshot that is time stamped with a time that is closest to but not newer than the time. Alternatively, the request may specify a snapshot number or some other information that may be used to identify a specific snapshot. If the controller has been making incremental snapshots, then the controller may also identify intermediate incremental snapshots made in between the snapshot that corresponds to the request and an initial snapshot of the volume.

The controller may then recreate the state of the volume that corresponds to the desired state by applying buffered writes stored in a write buffer based on a write buffer bitmap as well as a snapshot bitmap that corresponds to the desired state (block 815). If the snapshots are incremental snapshots, then the controller may need to apply buffered writes stored in a write buffer based on a write buffer bitmap as well as a snapshot bitmap that corresponds to the intermediate incremental snapshots.

Figure 9:
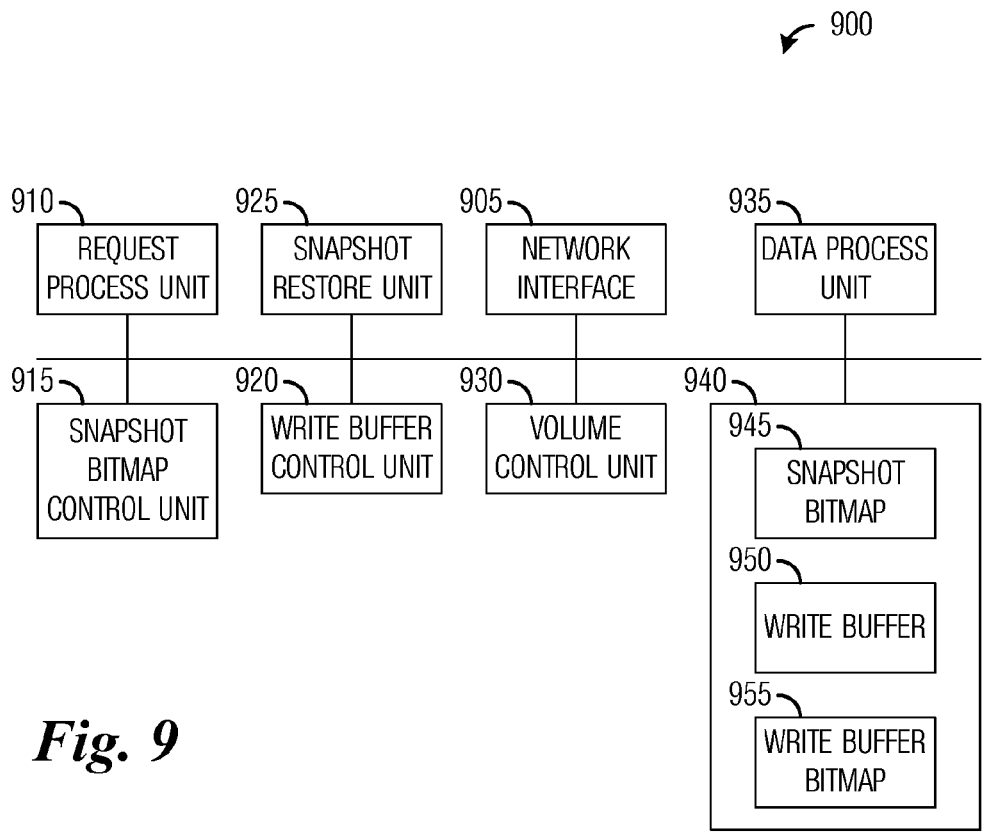
FIG. 9 provides a first example device according to example embodiments described herein.

FIG. 9 provides an alternate illustration of a device 900. Device 900 may be an implementation of a controller, such as a VBS-target, of a storage device. Device 900 may be used to implement various ones of the embodiments discussed herein. As shown in FIG. 9, a network interface 905 is configured to send and receive information and indications. Network interface 905 may be a wireless interface, a wireline interface, or a combination thereof.

A request processing unit 910 is configured to process requests for access to storage device(s) coupled to device 900. For example, request processing unit 910 processes access attempts, make snapshot requests, roll back requests, and so on. A snapshot bitmap control unit 915 is configured to generate an indicator (e.g., a snapshot bitmap) for blocks in a volume that has been changed during the making of a snapshot or since the making of a snapshot for incremental snapshots. For example, a single bit may correspond to a block that has been changed. A write buffer control unit 920 is configured to control a buffering of information of write access attempts as well as to generate an indicator (e.g., a write buffer bitmap) for blocks in the volume that correspond to buffered information associated with the write access attempts and the write access attempts. A snapshot restore unit 925 is configured to restore a state of a volume based on a snapshot or a plurality of incremental snapshots. Snapshot restore unit 925 may restore the state based on an initial snapshot and a snapshot bitmap, write buffer, and write buffer bitmap for the snapshot or for each snapshot in the plurality of incremental snapshots.

A volume control unit 930 is configured to control a volume, such as setting read/write access permissions for the volume. Volume control unit 930 is further configured to initiate a copying of the volume and to update the volume once the copying of the volume is complete. A data processing unit 935 is configured to process read requests and to generate information in a read access attempt based on a volume, snapshot bitmap, write buffer, write buffer bitmap, or combinations thereof. A memory 940 is configured to store indicators (e.g., snapshot bitmaps 945, write buffer bitmaps 955, and so on), information (e.g., write buffer 950), and so forth.

The elements of device 900 may be implemented as specific hardware logic blocks. In an alternative, the elements of device 900 may be implemented as software executing in a processor, controller, application specific integrated circuit, or so on. In yet another alternative, the elements of device 900 may be implemented as a combination of software and/or hardware.

As an example, network interface 905 may be implemented as a specific hardware block, while request processing unit 910, snapshot bitmap control unit 915, write buffer control unit 920, snapshot restore unit 925, volume control unit 930, and data processing unit 935 may be software modules executing in a microprocessor or a custom circuit or a custom compiled logic array of a field programmable logic array.

Figure 10:
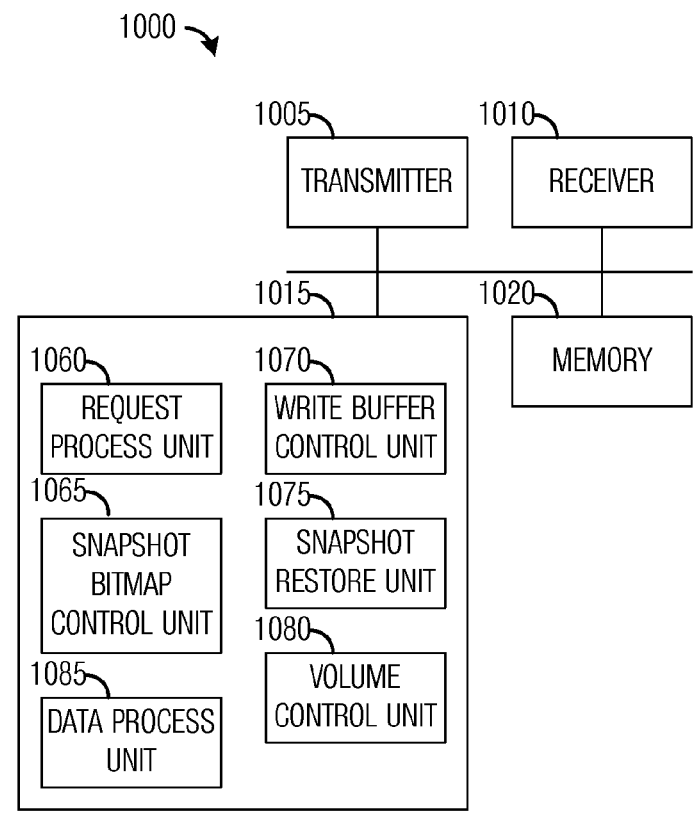
FIG. 10 provides a second example device according to example embodiments described herein.

FIG. 10 provides an alternate illustration of a device 1000. Device 1000 may be an implementation of a controller, such as a VBS-target, of a storage device. Device 1000 may be used to implement various ones of the embodiments discussed herein. As shown in FIG. 10, a transmitter 1005 is configured to send information and indications and a receiver 1010 is configured to receive information and indications. Transmitter 1005 and receiver 1010 may have wireless, wireline, or a combination thereof, interfaces.

A processor 1015, which may be a microprocessor, a custom circuit, a custom compiled logic array of a field programmable logic array, may implement some or all of request processing unit 1060, snapshot bitmap control unit 1065, write buffer control unit 1070, snapshot restore unit 1075, volume control unit 1080, and data processing unit 1085. Memory 1020 is configured to store indicators, information, and so forth.

The above described embodiments of device 900 and device 1000 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 4, 5, 6, 7, and 8—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method for making a snapshot of a volume, the method comprising:
receiving a write access attempt for the volume;
determining whether a snapshot of the volume is being taken;

based on a determination that a snapshot of the volume is being taken, buffering information associated with the write access attempt in a buffer;

updating a snapshot indicator in accordance with the information associated with the write access attempt, wherein the snapshot indicator comprises block information regarding a block in the volume that is a target of the write access attempt, wherein the snapshot indicator is stored in a snapshot bitmap;

also based on the determination that the snapshot of the volume is being taken, updating a buffer indicator in accordance with the information associated with the write access attempt, wherein the buffer indicator indicates whether the block in the volume that is the target of the write access attempt was accessed while the snapshot of the volume was being taken, and wherein the buffer indicator is stored in a buffer bitmap separate from the snapshot bitmap;

receiving a new write access attempt for the volume after the write access attempt;

using a new snapshot indicator, a new buffer, and a new buffer indicator for the buffering, the updating the snapshot indicator, and the updating the buffer indicator for the new write access attempt, wherein the new snapshot indicator is stored in a new snapshot bitmap separate from the snapshot bitmap and the buffer bitmap, and wherein the new buffer indicator is stored in a new buffer bitmap separate from the buffer bitmap and the snapshot bitmap;

receiving a read access attempt after receiving the new write access attempt; and fulfilling the read access attempt using the snapshot bitmap, the new snapshot bitmap, the buffer indicator, and the new buffer indicator.

2. The method of claim 1, wherein the snapshot comprises a non-incremental snapshot or an initial snapshot, and wherein the method further comprises copying the volume.

3. The method of claim 2, wherein the copying comprises copying the volume to a first storage device different from a second storage device containing the volume.

4. The method of claim 2, wherein the buffering, the updating the snapshot indicator, and the updating the buffer indicator is performed while the volume is being copied.

5. The method of claim 2, further comprising generating an updated volume in accordance with the volume, the snapshot indicator, the buffer, the buffer indicator, or combinations thereof, after the copying the volume has completed.

6. The method of claim 5, wherein generating an updated volume comprises, for the buffered information associated with the write access attempt, writing the buffered information to the updated volume.

7. The method of claim 6, wherein generating an updated volume further comprises, clearing an indication in the snapshot indicator for the block associated with the buffered information after writing the buffered information to the updated volume.

8. The method of claim 2, wherein the copying the volume further comprises storing a time indicator or a version indicator with the volume.

9. The method of claim 1, wherein the snapshot comprises an incremental snapshot or a non-initial snapshot, and wherein the method further comprises:

storing the snapshot indicator, the buffer, and the buffer indicator, wherein the snapshot indicator, the buffer, and the buffer indicator remain stored after using the new buffer indicator for updating the buffer indicator for the new write access attempt.

10. The method of claim 9, wherein the storing further comprises storing a time indicator or a version indicator with the snapshot indicator, the buffer, and the buffer indicator.

11. The method of claim 1, further comprising: receiving a request to make the snapshot of the volume, and setting the volume to a read-only mode in accordance with the request to make the snapshot of the volume.

12. A device comprising:
a network interface configured to receive a request to make a snapshot of a volume, to receive a write access attempt for the volume, to receive a new write access attempt for the volume after the write access attempt is received; and to receive a read access attempt for the volume after the new write access attempt is received;
a processor; and
computer executable instructions stored on a non-transitory computer readable storage medium, such that when executed by the processor cause the processor to perform the following:
determine whether a snapshot of the volume is being taken;
update a snapshot indicator in accordance with the write access attempt, wherein the snapshot indicator comprises block information regarding a block in the volume that is a target of the write access attempt, wherein the snapshot indicator is stored in a snapshot bitmap;
based on a determination that a snapshot of the volume is being taken, buffer information associated with the write access attempt to the volume in a buffer;
also based on the determination that the snapshot of the volume is being taken, update a buffer indicator in accordance with the information associated with the write access attempt, wherein the buffer indicator indicates whether the block in the volume that is the target of the write access attempt was accessed while the snapshot of the volume was being taken, and wherein the buffer indicator is stored in a buffer bitmap separate from the snapshot bitmap;
operate on a new buffer, a new snapshot indicator, and a new buffer indicator for the new write access attempt, wherein the new snapshot indicator is stored in a new snapshot bitmap separate from the snapshot bitmap and the buffer bitmap, and wherein the new buffer indicator is stored in a new buffer bitmap separate from the snapshot bitmap, the new snapshot bitmap, and the buffer bitmap; and
fulfilling the read access attempt using the snapshot bitmap, the new snapshot bitmap, the buffer indicator, and the new buffer indicator.

13. The device of claim 12, wherein the computer executable instructions cause the processor to further initiate a copying of the volume.

14. The device of claim 13, wherein the computer executable instructions cause the processor to further generate an updated volume after the copying of the volume is complete.

15. The device of claim 14, wherein the computer executable instructions cause the processor to further generate the updated volume by applying the snapshot indicator, the buffer, and the buffer indicator to the volume.

16. The device of claim 12, wherein the snapshot comprises an incremental snapshot, and wherein the device comprises a memory configured to store the buffer, the snapshot indicator, and the buffer indicator.

17. A device comprising:
a receiver configured to receive a write access attempt for a volume;

a processor; and computer executable instructions stored on a non-transitory computer readable storage medium, such that when executed by the processor cause the processor to perform the following:

determine whether a snapshot of the volume is being taken;

based on a determination that a snapshot of the volume is being taken, buffer information associated with a write access attempt to the volume in a buffer;

also based on the determination that the snapshot of the volume is being taken, update a buffer indicator in accordance with the information associated with the write access attempt, wherein the buffer indicator indicates whether a block in the volume that is a target of the write access attempt was accessed while the snapshot of the volume was being taken, and wherein the buffer indicator is stored in a buffer bitmap;

update a snapshot indicator in accordance with the write access attempt, wherein the snapshot indicator comprises information regarding the block in the volume that is the target of the write access attempt, and wherein the snapshot indicator is stored in a snapshot bitmap separate from the buffer bitmap;

receive a new write access attempt to the volume after the write access attempt;

based on a determination that a snapshot of the volume is being taken, buffer information associated with the new write access attempt;

also based on the determination that the snapshot of the volume is being taken, update a new buffer indicator in accordance with the information associated with the new write access attempt, wherein the new buffer indicator indicates whether a block in the volume that is a target of the write access attempt was accessed while the snapshot of the volume was being taken, and wherein the new buffer indicator is stored in a new buffer bitmap separate from the snapshot bitmap and the buffer bitmap;

update a new snapshot indicator in accordance with the new write access attempt, wherein the snapshot indicator comprises information regarding the block in the volume that is the target of the new write access attempt, and wherein the new snapshot indicator is stored in a new snapshot bitmap separate from the buffer bitmap and the snapshot bitmap;

receive a read access attempt after new write access attempt; and fulfill the read access attempt using the snapshot bitmap, the new snapshot bitmap, the buffer indicator, and the new buffer indicator.

18. The device of claim 17, wherein the computer executable instructions cause the processor to further copy the volume.

19. The device of claim 18, wherein the computer executable instructions cause the processor to further generate an updated volume in accordance with the volume, the snapshot indicator, the buffer, a buffer indicator, or combinations thereof, after the volume is copied.

20. The device of claim 17, wherein the snapshot comprises an incremental snapshot or a non-initial snapshot.

21. The device of claim 17, wherein the receiver is further configured to receive a request to make a snapshot of the volume, and wherein the computer executable instructions cause the processor to further set the volume to a read-only mode in accordance with the request to make the snapshot of the volume.

22. A method for making a snapshot of a volume, the method comprising:

receiving a request to make the snapshot of the volume;

receiving a write access attempt for the volume;

receiving a new write access attempt for the volume after receiving the write access attempt;

receiving a read access attempt for the volume;

setting write permission for the volume in accordance with the request to make the snapshot of the volume;

determine whether a snapshot of the volume is being taken;

updating a snapshot indicator in accordance with the write access attempt, wherein the snapshot indicator comprises block information regarding a block in the volume that is a target of the write access attempt, and wherein the snapshot indicator is stored in a snapshot bitmap;

based on a determination that a snapshot of the volume is being taken, buffering information associated with the write access attempt to the volume;

also based on the determination that the snapshot of the volume is being taken, updating a buffer indicator in accordance with the information associated with the write access attempt, wherein the buffer indicator indicates whether the block in the volume that is the target of the write access attempt was accessed while the snapshot of the volume was being taken;

wherein the buffer indicator is stored in a buffer bitmap separate from the snapshot bitmap; and using a new snapshot indicator, a new buffer, and a new buffer indicator for the updating the snapshot indicator, the buffering, and the updating the buffer indicator for the new write access attempt, wherein the new snapshot indicator is stored in a new snapshot bitmap separate from the snapshot bitmap and the buffer bitmap, and wherein the new buffer indicator is stored in a new buffer bitmap separate from the buffer bitmap and the snapshot bitmap; and fulfilling the read access attempt using the snapshot bitmap, the new snapshot bitmap, the buffer indicator, and the new buffer indicator.

23. The method of claim 22 further comprising copying the volume.

24. The method of claim 23 further comprising after copying the volume is completed, generating an updated volume by applying the snapshot indicator, the buffer, and the buffer indicator to the volume.

25. The method of claim 24, wherein generating an updated volume further comprises clearing an indication in the snapshot indicator for the block associated with the buffered information after writing the buffered information to the updated volume.

* * * * *